(12) United States Patent
Schuster

(10) Patent No.: US 10,703,443 B2
(45) Date of Patent: Jul. 7, 2020

(54) ADJUSTMENT MECHANISM AND WHEEL DRIVE

(71) Applicant: Praxis Works LLC, Santa Cruz, CA (US)

(72) Inventor: Gregor Schuster, Baden (AT)

(73) Assignee: Praxis Works LLC, Santa Cruz, CA (US)

( * ) Notice: Subject to any disclaimer, the term of this patent is extended or adjusted under 35 U.S.C. 154(b) by 0 days.

(21) Appl. No.: 16/315,958

(22) PCT Filed: Jun. 30, 2017

(86) PCT No.: PCT/EP2017/066363
§ 371 (c)(1),
(2) Date: Jan. 7, 2019

(87) PCT Pub. No.: WO2018/007264
PCT Pub. Date: Jan. 11, 2018

(65) Prior Publication Data
US 2019/0308692 A1 Oct. 10, 2019

(30) Foreign Application Priority Data

Jul. 6, 2016 (DE) .................. 10 2016 112 384

(51) Int. Cl.
*B62M 9/1342* (2010.01)
*B62M 9/12* (2006.01)
*B62M 9/124* (2010.01)

(52) U.S. Cl.
CPC ............ *B62M 9/1342* (2013.01); *B62M 9/12* (2013.01); *B62M 2009/12406* (2013.01)

(58) Field of Classification Search
CPC . B62M 9/134; B62M 9/14; B62M 9/12; B62J 43/00; B62J 45/40
USPC ........................................... 474/80
See application file for complete search history.

(56) References Cited

U.S. PATENT DOCUMENTS 3,448,628 A * 6/1969 Shimano .................. B62M 9/16
474/82
4,580,997 A * 4/1986 Browning ................ B62M 9/14
474/160
5,205,794 A * 4/1993 Browning ................ B62M 9/14
474/160

(Continued)

FOREIGN PATENT DOCUMENTS

WO         92/05067  A1    4/1992

OTHER PUBLICATIONS

European Patent Office, International Search Report and Written Opinion of the International Searching Authority, dated Oct. 11, 2017, in PCT/EP2017/066363, which is an international application that shares the same priority as this U.S. application.

*Primary Examiner* — Henry Y Liu
(74) *Attorney, Agent, or Firm* — Kolitch Romano LLP

(57) ABSTRACT

The present disclosure describes a gearshift mechanism for adjusting a gear ratio between a traction means, such as a chain, and a multi-sprocket gear set which can be rotated around an axle. The gearshift mechanism is configured to move the traction means in relation to the sprockets, such that an adjustment element is moved into the rolling motion of the traction means, thereby causing movement off of one sprocket and movement onto another sprocket.

14 Claims, 5 Drawing Sheets

(56) References Cited

U.S. PATENT DOCUMENTS

| | | | | |
|---|---|---|---|---|
| 5,273,495 | A * | 12/1993 | Nagano | B62M 9/00 |
| | | | | 474/144 |
| 9,221,518 | B2 * | 12/2015 | Tzvetkov | B62M 9/134 |
| 9,499,233 | B2 * | 11/2016 | Schuster | B62M 9/08 |
| 10,308,318 | B2 * | 6/2019 | Niki | B62M 9/132 |
| 2013/0225340 | A1 * | 8/2013 | Tzvetkov | B62M 9/134 |
| | | | | 474/80 |
| 2014/0265219 | A1 * | 9/2014 | Scolari | B62M 9/12 |
| | | | | 280/261 |
| 2018/0339747 | A1 * | 11/2018 | Niki | B62M 9/132 |

* cited by examiner

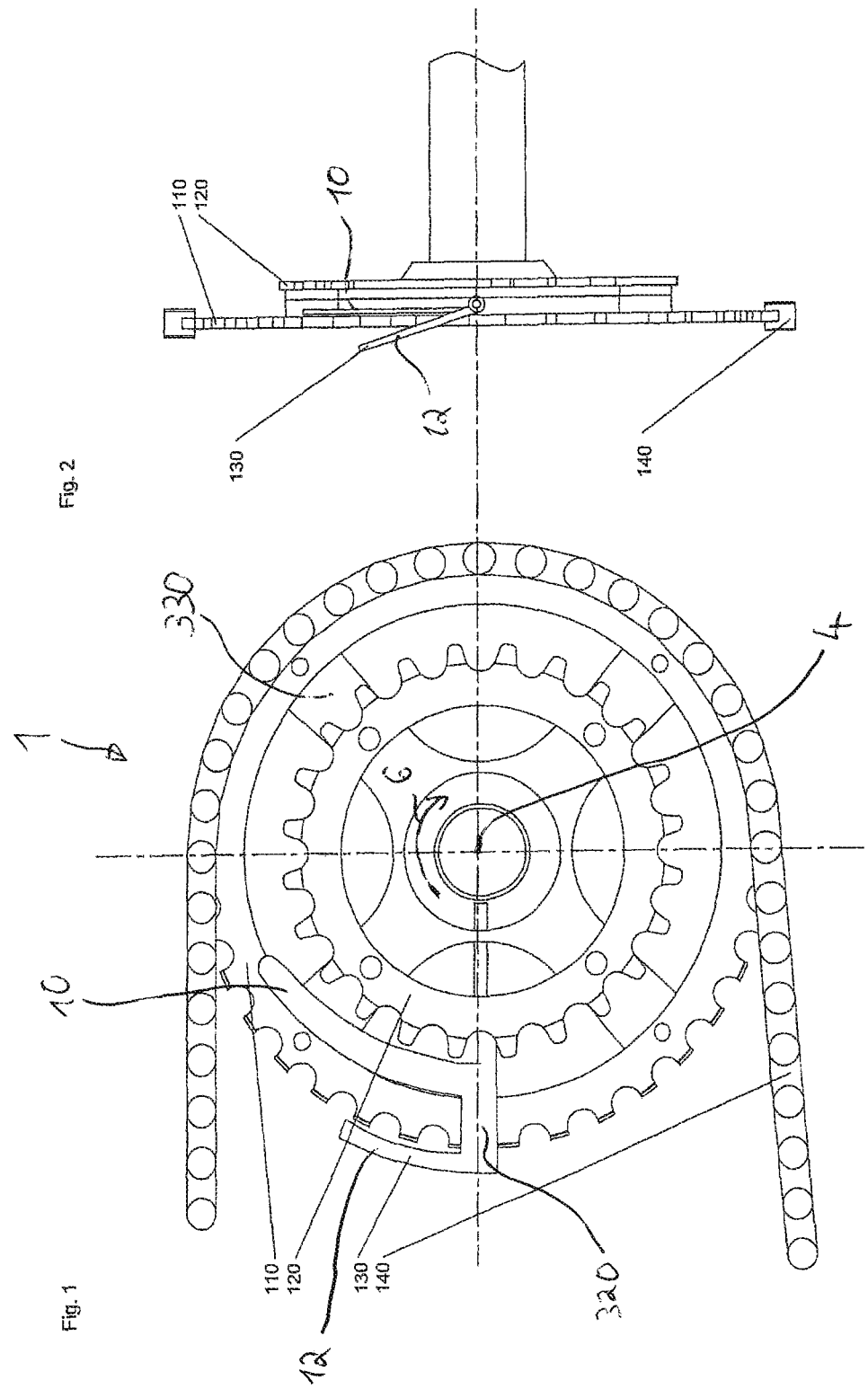

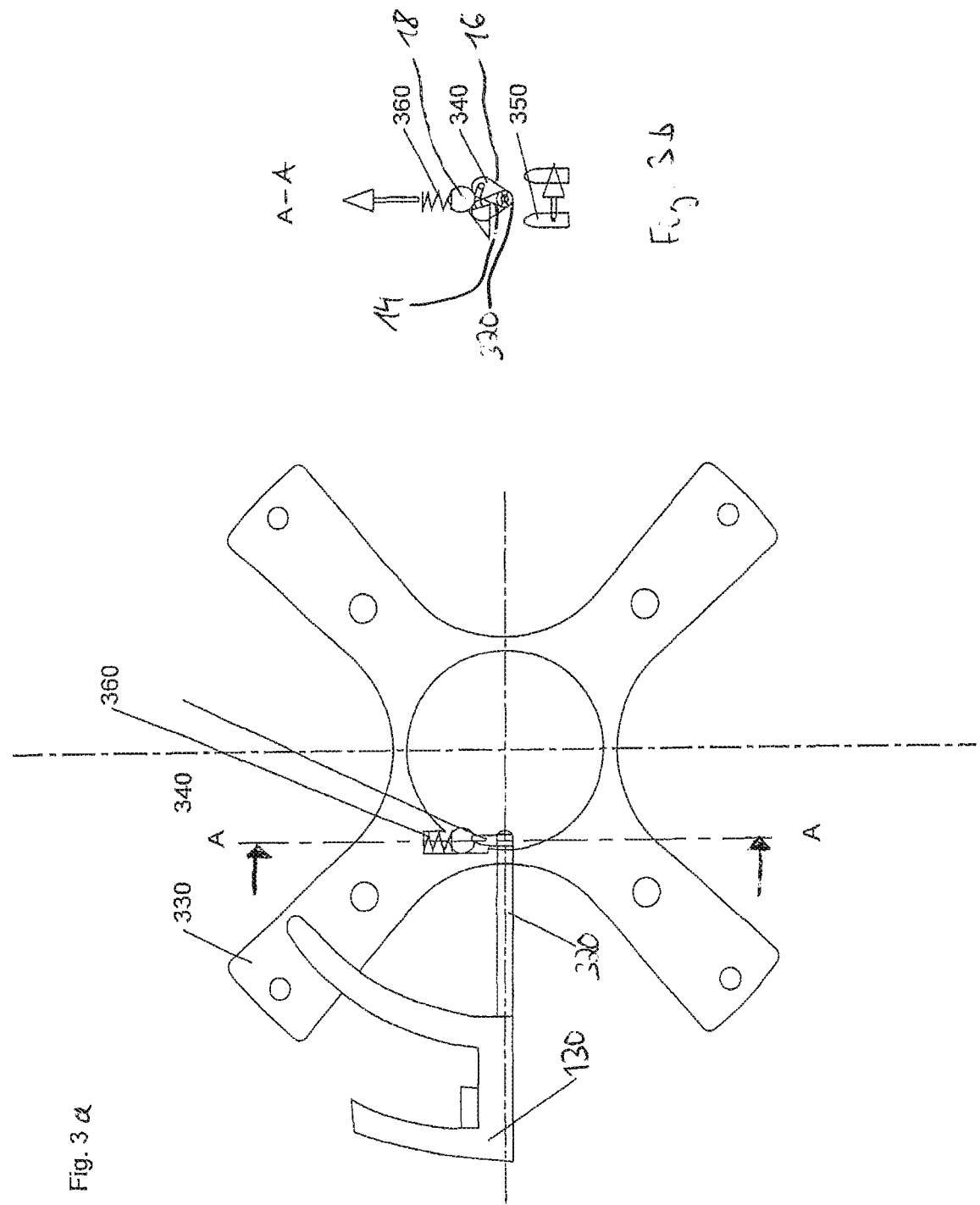

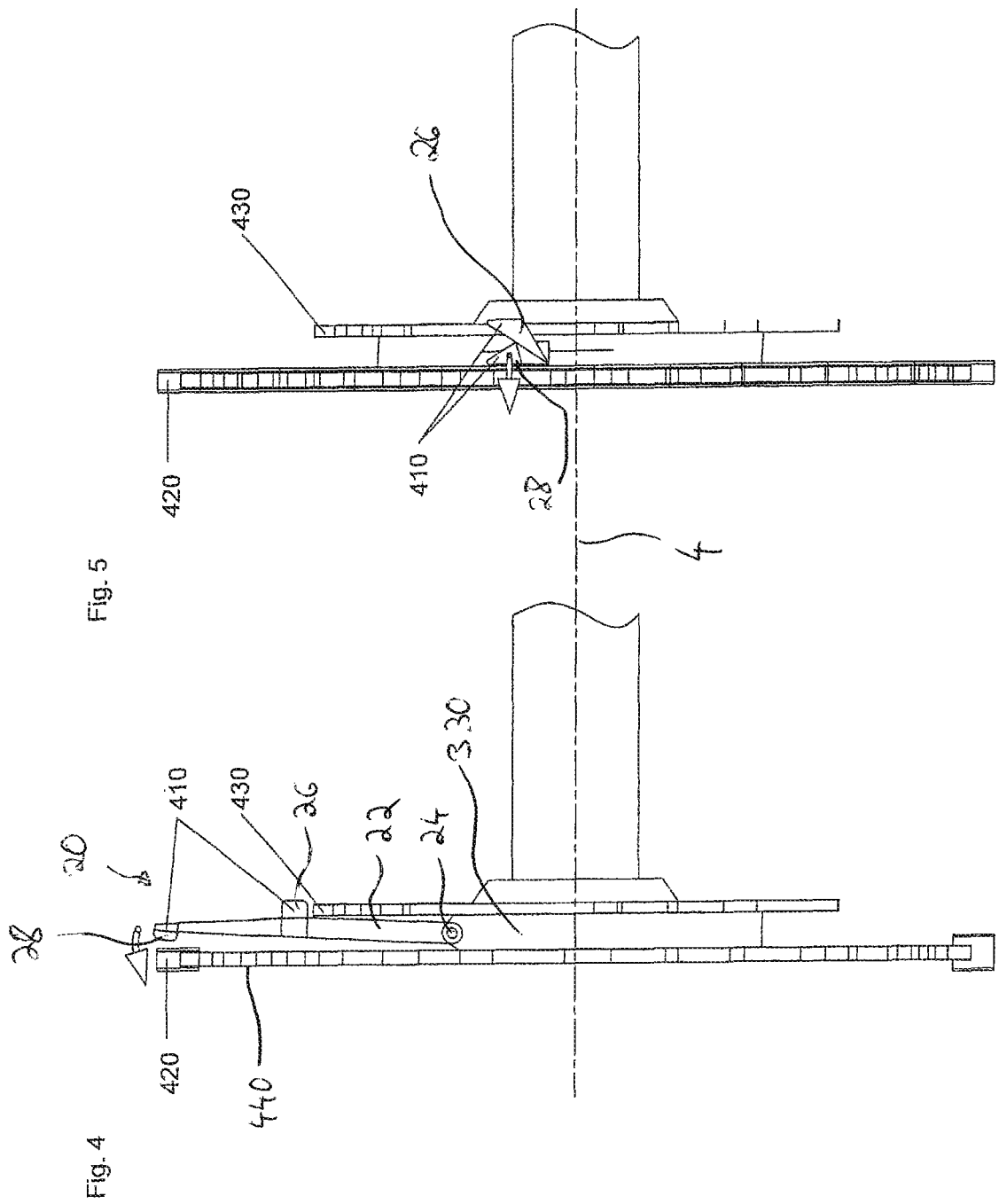

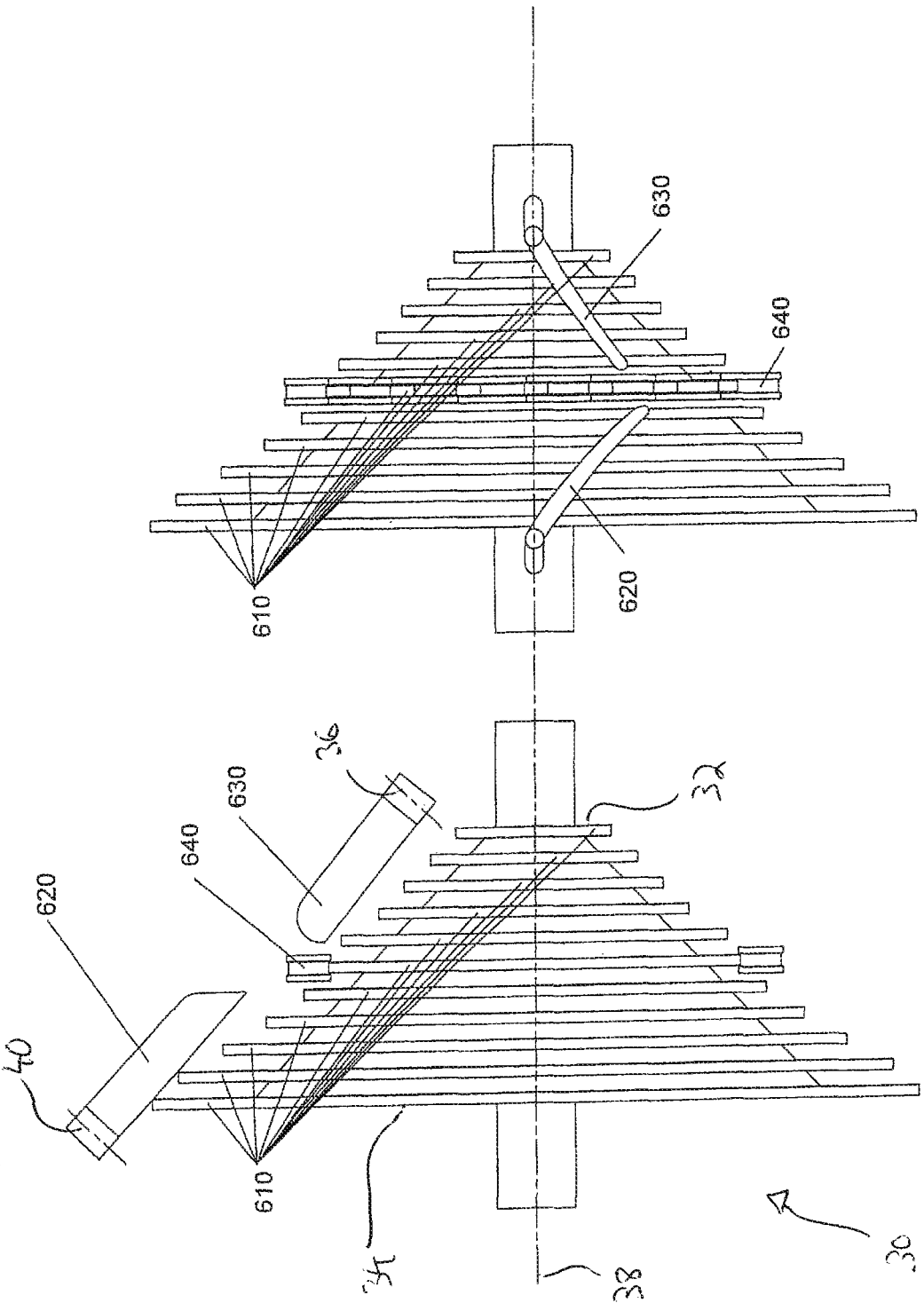

ADJUSTMENT MECHANISM AND WHEEL DRIVE

FIELD

The present disclosure relates to the area of multistage gearboxes for the transmission of power with endless, jointed, or flexible traction-transmitting means such as a belt or a chain.

INTRODUCTION

A first known approach includes a derailleur gearing system. Such systems are well known (cf. for example U.S. Pat. No. 3,448,628). A derailleur switches a chain and moves it axially on chain rings with different diameters that are arranged next to each other on an axis. This way, the gear ratio to the chain movement and subsequently to another chain ring in the chain alignment (which corresponds to the driven or the power-transmitting wheel) is changed.

This often leads to disadvantages because the chain is forced out of alignment by a fixed element, which is usually attached to the frame, and migrates to an adjacent axially arranged plate. Friction and noise is generated in the process between the fixed element and the passing traction means.

An alternative approach is gearshift systems. In these systems, gear ratios are changed by a gear drive, for example a planetary gear. The chain drive is only used as a power-transmitting element. Such systems are primarily used in the rear hub of the bicycle. The disadvantage here is the weight of such gear drives as well as the high design effort and economic expenditures.

Another alternative approach uses bevel gears and choke cams. Here, basically two graduated or cone-shaped plates are used between which the traction means runs. By making axial changes to the spacing between the plates, the traction means is forced onto different looping radii so as to change the gear ratio in this manner. This principle is only suitable for friction-locking and not for positive-locking traction means such as chains or toothed belts.

Another known approach uses a segment of the gear set (cf. for example PCT/US91/06946), which is swiveled out and thus used as a bridge to switch the traction means from one sprocket to an adjacent sprocket. This results in the disadvantage that the highly stressed sprockets must be separated and moved with a relatively high amount of actuating power which, in turn, presents special challenges for the control unit.

SUMMARY

It is therefore a task of the present disclosure to overcome the disadvantages associated with the approach that uses two or more axially arranged sprockets.

The task is solved with an adjustment mechanism according to the features of the independent claims.

Additional advantageous embodiments of the invention are described in the subclaims.

The present disclosure relates in particular to an adjustment mechanism for adjusting a gear ratio between a traction means, such as a chain or a belt, and a gear set which can be rotated around the axle, which comprises two or more plates. Depending on what is selected, the traction means will loop around one of the plates.

BRIEF DESCRIPTION OF THE DRAWINGS

Preferred embodiments are explained in further detail below with the help of schematic drawings:

FIG. 1 shows a side view of an adjustment mechanism with a gear set according to one embodiment, FIG. 2 shows a front view of the adjustment mechanism from FIG. 1, FIG. 3a shows a side view of an adjustment mechanism according to a further embodiment, FIG. 3b shows a sectional view of FIG. 3a, FIG. 4 shows a front view of an adjustment mechanism according to a further embodiment, FIG. 5 shows a top view of the adjustment mechanism from FIG. 4, FIG. 6 shows a front view of an adjustment mechanism according to a further embodiment, FIG. 7 shows a top view of the adjustment mechanism from FIG. 6.

DETAILED DESCRIPTION

Figure 8:
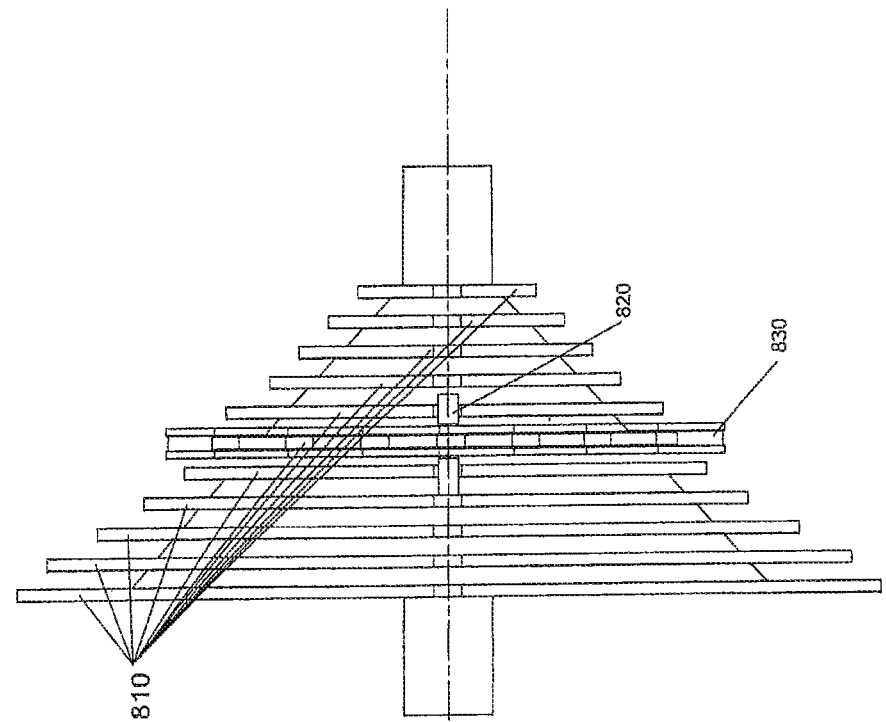
FIG. 8 shows a front view of an adjustment mechanism according to a further embodiment.
Figure 9:
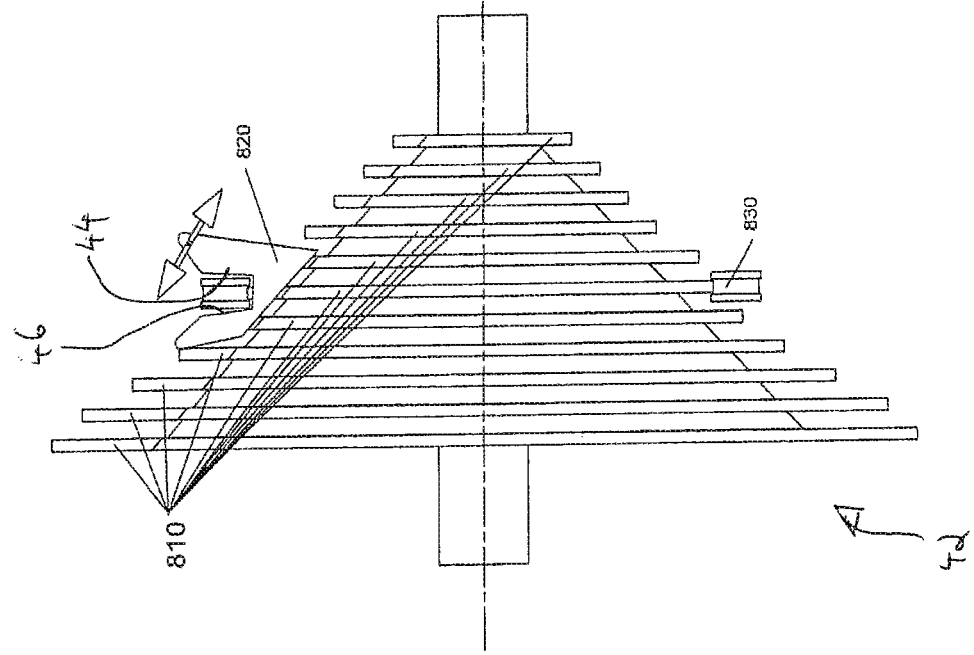
FIG. 9 shows a top view of the adjustment mechanism from FIG. 8.

The present disclosure describes an adjustment mechanism or a gearshift for the transfer of a, in particular rotary, traction means on a gear set, which can be rotated around the axle. It may comprise two or more sprockets or plates with external gear teeth, which preferably have a different diameter. The traction means may loop around the sprockets. Preferably, an additional adjustment element is provided that rotates together with the gear set. It may be moved into the rolling motion of the traction means. The movement into the rolling motion then preferably leads to a shifting of the traction means from one of the sprockets to another of the sprockets.

The solution has the advantage that no or almost no relative speed is present between the traction element and the traction means. Differently from prior art, this therefore avoids components having contact with each other and that are rotating, and at the same time a reliable and compact design is made available.

Therefore, the invention is based on an approach that uses a co-rotating system. It is hence a co-rotating adjustment mechanism that changes a traction means between gear sets. This results in less friction between the adjustment mechanism and the traction means. Furthermore, since there is no longer a fixed unit, any further assembly interface as well as the sensitive adjustment between the fixed adjustment element and the rotating sprockets is no longer necessary. In other words, the at least one co-rotating adjustment mechanism forces the traction means between the plates in the rotational movement to migrate to a different sprocket and to thus change the gear ratio.

The sprockets preferably comprise a full or substantially full set of outer teeth. Furthermore, the sprockets are preferably made from one piece. The sprockets are, in particular, customary sprockets which can simply be replaced as necessary.

In a further embodiment of the present disclosure, it is relatively easy from a technical perspective to provide an electrical co-rotating control which causes the adjustment element to be adjusted. Consequently, there is no relative speed between the control and the adjustment mechanism either because both co-rotate. The control may then be actuated, for example electrically, by way of a control element which is connected to the control wirelessly or by a wire. Alternatively, it is conceivable that the electrical control is not co-rotating or fixed, which may lead to a simpler embodiment.

Preferably, just one or one advancement aid each is provided on one of the sprockets or on a number of the sprockets or on all sprockets to move the traction means of a shifting operation radially outward toward the axle. It is conceivable, for example, that the adjustment element is provided for moving the traction means, in particular in the direction of the axle, for example, and that then the traction means can be moved outward by way of the advancement aid.

In another embodiment of the present disclosure, a switch may be provided as the adjustment element. This is an element that is technically relatively easy to provide and that, when moved into the rolling motion of the traction means, causes a movement of the traction means off the corresponding sprocket.

Preferably, the adjustment element, in particular in the form of a switch, is pivotable or rotatable around an axis of rotation. This axis may, for example, be placed at a radial distance from the axle and, in particular, be positioned on a plane that extends traversely in relation to the axle. Consequently, the axis of rotation may preferably be arranged tangentially in relation to a looping circle of the gear set, which leads to an advantageous pivoting mechanism.

Alternatively, it is conceivable to pivot or rotate the adjustment element, in particular in the form of a switch, around an axis of rotation that extends, in particular radially, from the axle to perform a switching operation, which leads to a particularly simple arrangement. Consequently, the adjustment element can easily be moved into the rolling motion of the traction means and thus cause the traction means to be moved off the sprocket. The traction means may then be switched onto another sprocket on the axle.

Preferably, the adjustment element, in particular in the form of a switch, can, from a technical point of view, be easily arranged between two sprockets in a space-saving manner.

The adjustment element, in particular in the form of a switch, can be moved to a first and a second shift position. It is conceivable, for example, to provide the adjustment element for a double crank of a bicycle.

In a further embodiment of the present disclosure, a mounting tool may be provided which can be used for attachment of the sprockets. The adjustment element may be positioned in or on the mounting tool in a technically simple, space-saving, and compact manner. The mounting tool and the adjustment element together provide a compact module to which the sprockets may then be fastened in a removable manner.

In a preferred exemplary embodiment, it is technically easy for the switch to comprise a rotating shaft. This rotating shaft may then extend along the axis of rotation, which may be arranged radially of the axle. From the rotating axis, the switch may then extend away, for example in the peripheral direction around the axle in the shape of a lug. The rotating axis and the switch may, for example, have the shape of an L.

In a preferred embodiment, the switch then has preferably a first switch segment and a second switch segment which may extend, for example, in the peripheral direction of the axle and in a direction away from the rotating axis. The first switch segment may then be arranged further inside in the radial direction relative to the axle. The first switch segment may furthermore be arranged in particular in the shape of a V and at an angle to the second switch segment. It is also conceivable that the first switch segment is longer, when seen from the peripheral direction and starting from the rotating axis, and in particular twice as long as the second switch segment. Consequently, the first switch segment may be moved into the rolling motion of the traction means in a first shift position, and the second switch segment may be moved into the rolling motion of the traction means in a second shift position. In other words, the switch segments can be angled in such a way that a sprocket is arranged between them when seen from the radial direction and in the state in which the traction means is not putting any pressure on them.

Preferably, the first switch segment is, when seen from the radial direction relative to the axle, arranged with a small first sprocket, whereby it is arranged in particular after the teeth. The second switch segment is, when seen from the radial direction relative to the axle, preferably provided after a large second sprocket. From the radial direction, therefore, the first switch segment may be arranged adjacent to the first sprocket and the second switch segment adjacent to the second sprocket. Furthermore, the first wheel segment may then, when seen from the radial direction relative to the axle, be arranged in front of the teeth or at least in front of the ends of the teeth of the bigger second sprocket. The switch segments are therefore arranged on the gear set in a space-saving and compact manner.

The switch segments are preferably designed in a space-saving and technically simple manner in the shape of a lug or finger. It is conceivable here that a connecting segment is formed between the switch segments, whereby for example the switch segments may then be provided as a single lug or as one piece.

Preferably, in a second shift position of the switch, the second switch segment may extend across the big second sprocket and the first switch segment may extend next to the second sprocket and/or between the two sprockets. Hereby, if the traction means runs in the large second sprocket, it may be moved off over the second switch. In a first shift position of the switch, at least the first switch segment may then extend across the small first sprockets, to move the same off in a simple manner, if the traction means is provided on the first sprocket. In the first shift position, it is conceivable that during the shifting operation the first switch segment is moved further to the outside by the traction means and that the second switch segment then engages with the traction means to then move the same off the small first sprocket. In other words, the first switch segment may serve as an extension that remains in rotation with the traction means and moves the second switch segment or the actual part of the switch that is to redirect the traction means from an intermediate position further, in particular to a stop.

In another preferred embodiment of the present disclosure, the switch may comprise a shifter. The shifter, which is radially spaced from the axis of rotation between the sprockets, may then extend outward. The shifter is therefore preferably arranged between the two sprockets. From the shifter then, a first switch segment may then extend away from a first switch segment, in particular in the direction of the axle, and preferably be arranged radially outside of the small first sprocket. A second switch segment may then also extend away from the shifter and then preferably be arranged radially outside of the large second sprocket. Such a switch is technically very simple and has a compact design with high mechanical rigidity. In other words, a shifter with two nose-shaped switches is provided that are spaced in the axial direction of the shifter.

In the switch with the shifter, the first switch segment may extend in a first shift position across the small first sprocket and the second switch segment may preferably be arranged next to the large second sprocket, in particular between the two sprockets. This way, the traction means can easily be moved off the first sprocket across the first switch segment. In a second shift position, it is conceivable that the second switch segment extends across the large second sprocket and the first wheel segment is arranged next to the small first sprocket, in particular between the two sprockets. Thus, the traction means can easily be moved away from the second sprocket here.

Preferably, the adjustment element in a respective embodiment may simply remain in its position after the shifting operation until a new shifting operation is to be performed.

In the exemplary embodiments, it is preferably provided that the first switch segment may transversely extend to the first small sprocket in the first shift position. This way, the traction means can then easily be guided from the first sprocket to the second sprocket. Furthermore, it is conceivable that the second switch segment may transversely extend to the big second sprocket in the second shift position, whereby then the traction means can be guided from the second sprocket to the first sprocket.

Preferably, the first switch segment may be guided in the first shift position in a rotation of the sprockets between the traction means and the small first sprocket so as to then divert the traction means.

In another embodiment of the present disclosure, a spring element may be provided that moves the adjustment element or the switch across to dead center to a respective end position or shift position and thus prevents an intermediate position.

If the switch has a rotating shaft, this shaft is preferably rotatably positioned in the mounting tool. The rotating shaft comprises here, for example at a distance from the switch, in particular at its end side, a lever or extension extending radially outward with which the switch can then be actuated. This makes it very easy to apply actuating force on the switch. The lever can then be supported in the peripheral direction of the rotating shaft on a retaining element in the first shift position with a first, in particular lateral, lever side and in a second shift position with a second, in particular lateral, lever side, whereby then preferably a spring force, in particular in the direction of the axis of rotation, may be applied on the retaining element. Furthermore, an actuating element may then be provided that, for shifting purposes, engages with the free side of the lever so as to apply an actuating force on it that acts on the lever in opposition to the spring force. It is therefore conceivable, for example, that the actuating force pushes the retaining element away against the spring force and that the retaining element can then hereby be guided from the one lever side to the other lever side. An actuating element that is provided is for example a non-co-rotating slotted link which can be brought into two shift positions. In a first shift position, the second lever side of the lever can then slide off the slotted link and be shifted in the process. In the second shift position, the respective other side of the lever can then slide off the slotted link and be brought to the second shift position. It is furthermore conceivable that stops are provided, in particular on the mounting tool, to delimit a rotational movement of the switch around the rotating shaft.

In another preferred embodiment of the present disclosure, it is conceivable that the adjustment mechanism for a gear set is provided in the form of a truncated conical cassette with two, three, or more sprockets.

If, for example, a truncated conical cassette is used, a first switch may, if seen from the axial direction of the cassette, be arranged on a small side of the cassette and a second switch on the other big side of the cassette. The switches may then reach across the cassette. With the first switch, the traction means may, for example, be shifted toward the big side, and with the second switch the traction means may, for example, be shifted toward the small side. To perform the shifting, a respective switch engages with the traction means, preferably laterally, and therefore moves into the rolling motion. The switches extend, for example, along the sheathed surface of the truncated conical cassette. Furthermore, it is conceivable that the switches, in particular in most of the shift positions, extend toward each other in the form of a V, for example. The two switches are, for example, rotatably positioned in a rotating shaft for the cassette.

Furthermore, it is possible that the adjustment element is formed as a slide, in particular when a truncated conical cassette is used. This slide may then be moved along the cassette to shift the traction means. The slide has, for example, two guide surfaces between which the traction means can be guided. To shift the traction means, either the one guide surface or the other guide surface may then engage with the traction means, in particular laterally. It is preferably provided for this embodiment that a slotted link or groove is provided in the cassette, which extends transversely to the axis of rotation of the cassette and in which the slide is then guided. The guiding surfaces of the slide are preferably part of a U-shaped guide groove.

According to the present disclosure, a drive for a vehicle, in particular a bicycle, is provided with a driving gear train or a driving individual sprocket and/or a drifting gear train or an individual drifting sprocket. The driving gear train and/or the drifting gear train preferably comprise an adjustment mechanism according to one or more of the aspects above.

The traction means is preferably provided between the two gear trains or between an individual sprocket and a gear train.

As a driving gear train, a crank with at least two sprockets for a bicycle is provided. As a drifting gear train, a manifold cassette may be provided which can be driven by a wheel, in particular a bicycle.

The applicant reserves the right to an independent claim that is geared toward a bicycle with a gear system according to one or more of the aspects above.

The adjustment mechanism according to the present disclosure is particularly suitable for a gearshift in which the adjustment mechanism is mounted to a gearwheel, for example a gearwheel that is used as a drive gear of a bicycle gearshift.

The adjustment mechanism according to the present disclosure may also be used in an intermediate gear which may be inserted between a driving gear train and a drifting gear train of a vehicle, in particular a bicycle.

The task is solved in particular by an adjustment mechanism of the type described above, with at least one adjustment component that co-rotates with the gear set, including at least one switch element whereby the gear ratio is changed or adjusted by detaching the switch element by way of a co-rotating or fixed mechanism which causes it to block the traction means in its movement toward the respective sprocket and therefore forces the traction means to switch to an adjacent sprocket.

This solution according to the present disclosure avoids a relative movement between the traction means on the sprocket and a fixed unit which, as in traditional derailleur systems, causes a switch of the traction means between the sprockets.

In the context of the present disclosure, just as in the area of traction means drives, the term "traction means" is generally understood as a flexible means of transmission under traction that joins several shafts for the transfer of a rotational movement of the shafts. To this purpose, the traction means loops around a certain angle range of at least one driving gear and/or at least one drifting gear. In general, the traction means is endless (generally closed in a loop); typically, the traction means is a chain, a belt, a toothed belt, or the like that can interact with a sprocket of the gear set in a positive-locking or friction-locking manner.

In a preferred further development of the adjustment mechanism according to the present disclosure, the switch/the switches is/are brought to their respective positions by electrical adjustment elements. These adjustment elements may be fixed but also be co-rotating and actuated by a radio connection or temporary contact.

In another preferred further development of the adjustment mechanism according to the present disclosure, the switch/the switches is/are actuated by a rotation-decoupled, partially co-rotating adjustment mechanism. Here, the fixed part is in permanent engagement with the rotating unit. This engagement may be disengaged by a rotational decoupling by way of a ball bearing.

According to FIG. 1, an adjustment mechanism 1 is shown. It has an adjustment device in the form of a switch 130. This switch is positioned in a mounting tool 330 and is able to co-rotate with it. On the mounting tool 330, a sprocket 110 or a sprocket with a large diameter and a sprocket 120 with a smaller diameter are provided which are detachably or permanently fastened to the mounting tool 330. The sprockets 110, 120 then form the gear set which is rotatable around an axle 4. The switch 130 therefore rotates together with the gear set around the axle 4. If the gear set is for a bicycle, it may be driven clockwise according to the rotational direction 6 in FIG. 1 to move the bicycle forward. Furthermore, according to FIG. 1, a traction means 140 or traction medium is provided in the form of a chain or bicycle chain. It is moved for example on the large sprocket 110 and engaged with its teeth.

The switch 130 is rotatably positioned in the mounting tool 2 by way of a rotating shaft 320. Furthermore, the switch 130 has a first switch segment 10 and a second switch segment 12. These extend from the rotating shaft 320 which, in turn, extends radially in relation to the axle 4. The switch segments 10, 12 protrude from the rotating shaft 320 in the rotational direction 6. The outer second switch segment 12 then extends parallel along the large sprocket 110, which the first switch segment 10 slightly distances itself radially from the smaller sprocket 120 as the distance from the rotating shaft 8 increases. The switch segments 10, 12 may also be joined, whereby these may be formed in particular as an integral, curved element.

FIG. 2 shows that the switch segments 10, 12 are arranged in an approximately V-shaped form. They are connected with each other, for example by way of a connecting segment, but this does not change their V-shaped arrangement.

FIG. 2 shows a second shift position of the switch 130. Here, the second switch segment 12 reaches across the teeth of the large sprocket 110. During a rotational movement of the sprocket 110, the second switch segment 12 is then moved into a rolling movement of the traction means 140, whereby it can then glide off on the second switch segment 12 and be guided to the small sprocket 120. The first switch segment 10 is located in the second shift position between the two sprockets 110, 120. If the traction means 140 is located on the small sprocket 120, it may be guided to the large sprocket 110 when the switch 130 is brought to a first shift position. Hereby, the first switch segment 10 first reaches across the teeth of the small sprocket 120. If then the first switch segment 10 enters the rolling motion of the traction means 140, it is first moved by the traction means 140 radially away from the large sprocket 110 and moved further around its rotational shaft 8, whereby then additionally the second switch segment 12 reaches across the small sprocket 120. Then, the traction means 140 can be guided across the second switch segment 12 to the large sprocket 110 and, if necessary, be brought into engagement with the teeth by way of an advancement aid.

FIG. 3a shows the mounting tool 330 and the bearing 130, which is then rotatably positioned by way of the rotational shaft 320 or the shaft.

FIG. 3b shows a simplified sectional view along the intersection A-A from FIG. 3a. It shows that the rotational shaft 320 has a lever 340 or extension at its end which radially extends away from it. FIG. 3b shows two positions of the lever 340. The switch 130 is located in a right position of the lever 340, refer to FIG. 3a, in a first shift position and in the other position in a second shift position. The lever 340 has a first lever side 14 and a second lever side 16. From the first lever side 14, spring force is applied to the lever 340 in the first shift position by way of a retaining element 18. This force is generated by a spring 360, which is preferably supported by the mounting tool 330, refer to FIG. 3a. Furthermore, the switch 130 may be directly or indirectly supported by a stop of the mounting tool 330, which is not shown here, so that the rotational movement of the switch 130 is restricted. An actuating element 350 is provided for shifting from the first shift position to the second shift position. It may be fixed in a non-rotatable manner for example around the axle 4, refer to FIG. 1, and be used as a slotted link. During a rotational movement of the switch 130, then the second lever side 16 of the lever 340 can then slide along the actuating element 350 in the first shift position and hereby be guided to the second shift position. The lever 340 pushes the retaining element 18 against the spring force of the spring 360 so that the, in particular ball-shaped, retaining element 18 glides across its rounded front side and abuts against the second lever side 16. Should, however, the lever 340 be shifted from its second shift position to the first shift position, the actuating element 350 would be moved accordingly so that then the first lever side 14 would slide off it to then guide the lever 340 to the first shift position.

FIG. 4 shows a further embodiment of a switch 20. It has a gear lever 22 which is rotatably attached to the mounting tool 330. An axis of rotation 24 extends here tangentially toward the axle 4. The gear lever 22 then protrudes from the axis of rotation 24 between a small sprocket 430 and a large sprocket 440. The switch 20 furthermore comprises a first switch segment 26 and a second switch segment 28. These also protrude from the gear lever 22 and are arranged with each other in the form of a V, refer to FIG. 5.

FIG. 6 shows a cassette 30 with a plurality of sprockets 610. On a small side or front side 32 of the cassette 30, a first switch 630 or outer switch is provided here. Furthermore, a second switch 620 or an inner switch is provided on the large side or large front side 34 of the cassette. The first switch 630 is here rotatable around an axis of rotation 36, which may be on the same plane of an axle 38 and arranged transversely to the axle 38, so that the first switch 630 may be rotatable along a sheathed side of the conical cassette 30. An axis of rotation 40 is provided for the second switch 620 which is on one plane at least with the axle 38. The axis of rotation 40 is arranged transversely to the axle 38 as well so that the second switch 620 may be rotatable for example along the sheathed side of the cassette 30.

According to FIG. 7, the switches 620 and 630 are formed so that they can each reach across some of the sprockets. It is also conceivable that a respective switch is long enough to reach across all sprockets or n-1 sprockets each, whereby n is the number of the sprockets.

FIG. 8 shows a cassette 42 in which an adjustment element in the form of a slide 820 is provided. It may then encircle a traction means 830, whereby then the traction means 830 is arranged between a first guiding surface 44 and a second guiding surface 46 of the slide 820.

Below, aspects of the invention are explained with other words.

FIG. 1 illustrates the principle that the present disclosure is based on, i.e., the principle of two sprockets 110, 120 that are axially positioned next to each other in the moment the traction means is shifted from the small to the larger sprocket 110, 120. What is shown here is the adjustment element 130 that, by way of the shift position, diverts in the shift position the traction means 140 from the large sprocket and then moves it to the small sprocket.

FIG. 2 illustrates a top view of the unit shown in FIG. 1 from the front. It shows the position of the switch 130 in which the traction medium 140 is forced to move from a larger 110 to a smaller sprocket 120.

FIG. 3 shows a schematic representation of the adjustment mechanism, here shown in the form of a switch 310, a formed plate, which can be moved around a shaft 320 in the mounting tool 330. An extension 340 on the inner part of the shaft 320 can be used to control the switch 310 as it briefly collides with a fixed unit including an element 350, which may be located axially in two positions, and which jumps into one of the two end positions forced by a snapping spring 360. Consequently, the switch assumes one of the two end positions by being pushed against the one stop. By way of the traction means to which traction force is applied and that comes into contact with the switch, this force against the stop is increased once again.

The switch itself is formed from a top and a bottom lug, whereby the bottom lug is the longer one and both have a certain angle to each other. The inner lug has the task to capture the traction means in the second, middle position during the shifting from a large to a small sprocket and to push it against the stop so that the outer lug can capture the traction means and divert it from the small sprocket. If the switch then comes into the range in which the traction means no longer loops around the sprocket, it returns to a middle position again in a spring-loaded manner. This has the advantage that there are no far-protruding elements on the large rotation diameter in the non-looped area, only from the position of the shift point until the traction means is left.

FIG. 4 shows another embodiment in which the adjustment element 410 may be pivoted in an axis that is tangentially fixed to the axis of rotation. In doing so, the switch 410 can enter the path of the traction means 420 so that it must switch to the second sprocket 430 and 440.

FIG. 6 shows an embodiment with several sprockets 610 arranged on an axis and an adjustment element that includes an inner 620 and outer 630 switch which therefore guide the traction means 640 always to a sprocket selected by the axial position.

FIG. 8 shows an embodiment with several sprockets 810 arranged on an axis and an adjustment element 820 that is axially moved in a linear fashion and thus always moves the traction means 830 in its rolling motion to the selected sprocket.

Furthermore, an adjustment mechanism with one or more of the following aspects may be provided:

Aspect 1: In a preferred aspect of an adjustment mechanism for adjusting a gear ratio between a traction means and a gear set that is rotatable around an axle in which two or more plates are alternately looped by the traction means, at least one co-rotating adjustment element is provided that can be moved into a rolling motion of the traction means and thus cause the movement of the traction means to another sprocket located on the axle.

Aspect 2: Adjustment mechanism according to aspect 1, characterized by a switch as the adjustment device which is moved into the rolling motion of the traction means around a radial point of rotation, thus causing the traction means to be diverted from the sprocket and to be guided to another sprocket on the axle.

Aspect 3: Adjustment mechanism according to any of the preceding aspects characterized by a switch as the adjustment device which is moved into the rolling motion of the traction means around a tangential point of rotation, thus causing the traction means to be diverted from the sprocket and to be guided to another sprocket on the axle.

Aspect 4: Adjustment mechanism according to any of the preceding aspects, characterized by a double-switch as the adjustment device which guides the traction means to a desired sprocket by a linear movement along the sprockets.

Aspect 5: Adjustment mechanism according to any of the preceding aspects, characterized by a fixed control that assumes a selected position and that moves into the rotational path of an extension of the switch and thus, by way of a collision with the same, pushes the switch into a preferred position.

Aspect 6: Adjustment mechanism according to any of the preceding aspects, characterized by an electrical co-rotating control that causes the switch to be adjusted.

Aspect 7: Adjustment mechanism according to any of the preceding aspects, characterized by a rotation-decoupled partially co-rotating and partially fixed control detached by the use of a bearing so that it is permanently in engagement and causes the switch to be adjusted.

Aspect 8: Adjustment mechanism according to any of the preceding aspects, characterized by a spring element that brings the switch across a dead center to a respective end position and thus prevents an intermediate position.

Aspect 9: Adjustment mechanism according to any of the preceding aspects, characterized by a switch comprising an extension which, in rotation, hooks into the traction means and rotates the actual part of the switch that diverts the traction means further from an intermediate position.

Aspect 10: Adjustment mechanism according to any of the preceding aspects that is used in a driving gear train and a coasting gear train of a vehicle, in particular a bicycle.

A0. Adjustment mechanism for adjusting a traction means (140) on a gear set, which can be rotated around an axle (4), comprising two or more sprockets (110, 120) around which the traction means (140) may loop, characterized in that at least one adjustment element (20) that co-rotates with the gear set is provided which can be moved into the rolling motion of the traction means (140) to cause the movement of the traction means (140) from one of the sprockets (110, 120) to another of the sprockets (110, 120).

A1. Adjustment mechanism according to paragraph A0, whereby the adjustment element (130) is pivotable around an axis of rotation (24) which is radially spaced from the axle (4) and is located on a plane that extends in a traverse direction relative to the axle (4) or whereby the adjustment element (130) is pivotable around an axis of rotation (320) that extends in a radial direction relative to the axle (4).

A2. Adjustment mechanism according to paragraph A1, whereby the switch (130) comprises a rotating shaft (320) that extends along the axis of rotation (24) radially arranged relative to the axle (4) and whereby the switch (130) extends from the side of the rotating shaft (320).

A3. Adjustment mechanism according to paragraph A2, whereby the switch (130) has a first switch segment (10) and a second switch segment (12) which extend in the peripheral direction and in a direction away from the rotating shaft (320), whereby the first switch segment (10) when seen from the radial direction is arranged further inward and whereby the first switch segment (10) is arranged at an angle to the second switch segment (12).

A4. Adjustment mechanism according to paragraph A3, whereby the first switch segment (10) when seen from the radial direction relative to the axle (4) is arranged after a small first sprocket (120) and the second switch segment (12) after a large second sprocket (110).

A5. Adjustment mechanism according to any of the preceding paragraphs A0 through A4, whereby a fixed control (350) is provided which may be brought into a selected position and which may be moved into a rotational plane of an extension (340) of the switch (130) to push, by collision with the same, the switch (130) into a preferred position.

A6. Adjustment mechanism according to any of the preceding paragraphs A0 through A5, whereby an electrically co-rotating control is provided that adjusts the adjustment element.

A7. Adjustment mechanism according to any of the preceding paragraphs A0 through A6, whereby a rotation-decoupled, partially co-rotating and partially fixed control is detached by the use of a bearing which is so permanently engaged that it achieves the adjustment of the switch.

A8. Adjustment mechanism according to any of the preceding paragraphs A0 through A7, whereby a spring element (360) is provided that moves the switch (130) across a dead center to a respective end position and thus prevents an intermediate position.

A9. Adjustment mechanism according to any of the preceding paragraphs A0 through A8, whereby the switch (130) has an extension (10) which catches with the traction means (140) in a rotation and further deflects the actual part (12) of the switch (120) that redirects the traction means (140).

A10. Adjustment mechanism according to any of paragraphs A1 to A9, whereby a shifter (22) of the switch (20) is provided that extends away from the axis of rotation (24), which is radially spaced relative to the axle (4) between the sprockets (430, 440), whereby a first switch segment (26) protrudes from the shifter (22) and is arranged radially outside of the small first sprocket (430) and whereby a second switch segment (28) protrudes from the shifter (22) and is arranged radially outside of the large second sprocket (440).

A11. Adjustment mechanism according to any of paragraphs A3 to A10, whereby the first switch segment (10, 26) extends in the first shift position transversely to the small first sprocket (120, 430) to switch the traction means from the first sprocket (120, 430) to the second sprocket (110, 440) and whereby the second switch segment (12, 28) extends in the second shift position transversely to the large second sprocket (110, 440) to switch the traction means (140, 420) from the second sprocket (110, 440) to the first sprocket (120, 430).

A12. Adjustment mechanism according to any of the preceding paragraphs, whereby, seen from an axial direction, a first switch (630) is arranged on a small side (32) of the gear set (30) and a second switch (620) on the other large side (43) of the gear set, and whereby the switches (620, 630) reach across the gear set, and whereby the traction means (640) can be shifted toward the large side (34) by way of the first switch (630) and the traction means (640) can be shifted toward the small side (32) by way of the second switch (620).

A13. Adjustment mechanism according to any of the preceding paragraphs A0 through A12, whereby the or an adjustment element is formed as a slide (820) which may be moved along the sheathed side of the gear set for shifting the traction means (830).

B0. Drive for a vehicle with a driving gear train or an individual sprocket and/or a drifting gear train or an individual sprocket, whereby the driving gear train and/or the drifting gear train comprise only one or one adjustment mechanism each according to any of the preceding paragraphs A0 through A13.

The invention claimed is:

1. A gearshift for adjusting a traction means (140) on a gear set which can be rotated around an axle (4), the gear set including two or more sprockets (110, 120) around which the traction means (140) may loop, the gearshift comprising:
   at least one adjustment element that co-rotates with the gear set, wherein the at least one adjustment element is configured to be moved into a rolling motion of the traction means (140) to cause movement of the traction means (140) from one of the sprockets (110, 120) of the gear set to another of the sprockets (110, 120) of the gear set;
   wherein the adjustment element is pivotable around an axis of rotation that extends in a radial direction relative to the axle (4); and
   wherein the adjustment element comprises a switch (130) having a rotating shaft (320) that extends along the axis of rotation and wherein the switch (130) extends from a side of the rotating shaft (320).

2. The gearshift according to claim 1, wherein the switch (130) has a first switch segment (10) and a second switch segment (12), each of which extends in a peripheral direction and in a direction away from the rotating shaft (320);
   wherein the first switch segment (10) is arranged further inward in a radial direction relative to the second switch segment; and
   wherein the first switch segment (10) is arranged at an angle to the second switch segment (12).

3. The gearshift according to claim 1, wherein a first switch segment (10), when seen from a radial direction relative to the axle (4), is arranged after a smaller first sprocket (120) and a second switch segment (12) after a larger second sprocket (110).

4. The gearshift according to claim 1, wherein a first switch segment (10) extends in a first shift position transversely to a smaller first sprocket (120) to switch the traction means from the smaller first sprocket (120) to a larger second sprocket (110) and wherein a second switch segment (12) extends in a second shift position transversely to the larger second sprocket (110) to switch the traction means (140) from the larger second sprocket (110) to the smaller first sprocket (120).

5. The gearshift according to claim 1, further comprising a fixed control (350) configured to be brought into a selected position and movable into a rotational plane of an extension (340) of the adjustment element to physically push the adjustment element into a preferred position.

6. The gearshift according to claim 1, further comprising a rotation-decoupled, partially co-rotating and partially fixed control, detachable by use of a bearing, such that the control is permanently in engagement and achieves adjustment of the adjustment element.

7. The gearshift according to claim 1, further comprising a spring element (360) configured to move the adjustment element across a dead center to a respective end position and thus prevent an intermediate position.

8. The gearshift according to claim 1, whereby the adjustment element has an extension (10) which catches with the traction means (140) in a rotation and further deflects an actual part (12) of the adjustment element that redirects the traction means (140).

9. The gearshift according to claim 1, further comprising a drive for a vehicle with a driving gear train, wherein the driving gear train comprises only one gearshift according to claim 1.

10. A gearshift for adjusting a traction means (140) on a gear set which can be rotated around an axle (4), the gear set including two or more sprockets (110, 120) around which the traction means (140) may loop, the gearshift comprising:
   at least one adjustment element that co-rotates with the gear set, wherein the at least one adjustment element is configured to be moved into a rolling motion of the traction means (140) to cause movement of the traction means (140) from one of the sprockets (110, 120) of the gear set to another of the sprockets of the gear set (110, 120); and
   an electrical co-rotating control configured to adjust the adjustment element.

11. The gearshift according to claim 10, wherein the adjustment element comprises a switch pivotable around an axis of rotation (24) which is radially spaced from the axle (4) and is located on a plane that extends in a transverse direction relative to the axle (4).

12. The gearshift according to claim 11, further comprising a shifter (22) of the switch (20) that extends away from the axis of rotation (24), which is radially spaced relative to the axle (4) between the sprockets (430, 440);
   wherein a first switch segment (26) protrudes from the shifter (22) and is arranged radially outside of a smaller first sprocket (430); and
   wherein a second switch segment (28) protrudes from the shifter (22) and is arranged radially outside of a larger second sprocket (440).

13. The gearshift according to claim 12, wherein the first switch segment (26) extends in a first shift position transversely to the smaller first sprocket (430) to switch the traction means from the smaller first sprocket (430) to a larger second sprocket (440), and wherein the second switch segment (28) extends in a second shift position transversely to the larger second sprocket (440) to switch the traction means (420) from the larger second sprocket (440) to the smaller first sprocket (430).

14. The gearshift according to claim 10, wherein, as seen from an axial direction, a first switch (630) is arranged on a smaller side (32) of the gear set (30) and a second switch (620) on the other, larger side (34) of the gear set; and
   wherein the first and second switches (620, 630) reach across the gear set; and
   wherein the traction means (640) can be shifted toward the larger side (34) by the first switch (630) and the traction means (640) can be shifted toward the smaller side (32) by the second switch (620).

* * * * *